US010365988B2

(12) United States Patent
Combs et al.

(10) Patent No.: US 10,365,988 B2
(45) Date of Patent: *Jul. 30, 2019

(54) MONITORING PERFORMANCE OF A PROCESSING DEVICE TO MANAGE NON-PRECISE EVENTS

(71) Applicant: Intel Corporation, Santa Clara, CA (US)

(72) Inventors: Jonathan D. Combs, Austin, TX (US); Michael W. Chynoweth, Rio Rancho, NM (US); Jason W. Brandt, Austin, TX (US); Corey D. Gough, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,854

(22) Filed: Sep. 15, 2017

(65) Prior Publication Data

US 2018/0004620 A1 Jan. 4, 2018

Related U.S. Application Data

(63) Continuation of application No. 14/292,140, filed on May 30, 2014, now Pat. No. 9,766,999.

(51) Int. Cl.
*G06F 11/00* (2006.01)
*G06F 11/34* (2006.01)

(52) U.S. Cl.
CPC ........ *G06F 11/348* (2013.01); *G06F 11/3466* (2013.01); *G06F 2201/86* (2013.01); *G06F 2201/88* (2013.01)

(58) Field of Classification Search
CPC .................................................. G06F 11/3466
See application file for complete search history.

(56) References Cited

U.S. PATENT DOCUMENTS 5,875,294 A * 2/1999 Roth ................... G06F 11/3466
710/18
9,063,762 B2 6/2015 Serebrin et al.
(Continued)

OTHER PUBLICATIONS

USPTO, Office Action for U.S. Appl. No. 14/292,140, dated Jan. 12, 2016.
(Continued)

*Primary Examiner* — Christopher S McCarthy
(74) *Attorney, Agent, or Firm* — Lowenstein Sandler LLP

(57) ABSTRACT

Embodiments disclosed herein provide for monitoring performance of a processing device to manage non-precise events. A processing device includes a performance counter to track a non-precise event and to increment upon occurrence of the non-precise event, wherein the non-precise event comprises a first type of performance event that is not linked to an instruction in an instruction trace. The processing device also includes a first handler circuit to generate and store a first record, the first record comprising architectural metadata defining a state of the processing device at a time of generation of the first record, wherein the first handler circuit to generate records corresponding to precise events. The processing device further includes a second handler circuit communicably coupled to the first handler circuit, the second handler circuit to cause the first handler circuit to generate a second record for the non-precise event upon overflow of the performance counter.

20 Claims, 14 Drawing Sheets

(56) References Cited

U.S. PATENT DOCUMENTS

| | | |
|---|---|---|
| 2007/0006032 A1 | 1/2007 | Sun |
| 2009/0083735 A1 | 3/2009 | Kimura |
| 2009/0157359 A1 | 6/2009 | Chernoff |
| 2009/0276185 A1 | 11/2009 | Mericas |
| 2010/0235836 A1 | 9/2010 | Bratanov |
| 2012/0046912 A1 | 2/2012 | Indukuru et al. |
| 2012/0226477 A1 | 9/2012 | Cascaval et al. |
| 2013/0019248 A1 | 1/2013 | Yu |
| 2014/0013020 A1 | 1/2014 | Horsnell et al. |
| 2014/0013091 A1* | 1/2014 | Yasin ................. G06F 11/3466 712/244 |
| 2014/0344831 A1 | 11/2014 | Levine |
| 2017/0220447 A1* | 8/2017 | Brandt ................. G06F 9/4812 |
| 2017/0262290 A1* | 9/2017 | Yasin .................... G06F 9/3857 |
| 2018/0088861 A1* | 3/2018 | Yasin .................... G06F 3/0656 |

OTHER PUBLICATIONS

USPTO, Final Office Action for U.S. Appl. No. 14/292,140, dated May 17, 2016.
USPTO, Office Action for U.S. Appl. No. 14/292,140, dated Oct. 4, 2016.
USPTO, Final Office Action for U.S. Appl. No. 14/292,140, dated Mar. 9, 2017.
USPTO, Notice of Allowance for U.S. Appl. No. 14/292,140, dated May 24, 2017.

* cited by examiner

MONITORING PERFORMANCE OF A PROCESSING DEVICE TO MANAGE NON-PRECISE EVENTS

PRIORITY CLAIM TO RELATED APPLICATION

This application is a continuation of and claims the benefit under 35 U.S.C. § 120 of U.S. patent application Ser. No. 14/292,140, filed on May 30, 2014, the entirety of which is incorporated herein by reference.

TECHNICAL FIELD

The embodiments of the disclosure relate generally to a processing device including a logic circuit for monitoring performance of the processing device, and, more specifically, relate to monitoring performance of a processing device to manage non-precise events.

BACKGROUND

Performance analysis is the foundation for characterizing, debugging, and tuning a micro-architectural design, finding and fixing performance bottlenecks in hardware and software, as well as locating avoidable performance issues. As the computer industry progresses, the ability to analyze the performance of a microarchitecture and make changes to the microarchitecture based on that analysis becomes more complex and important.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
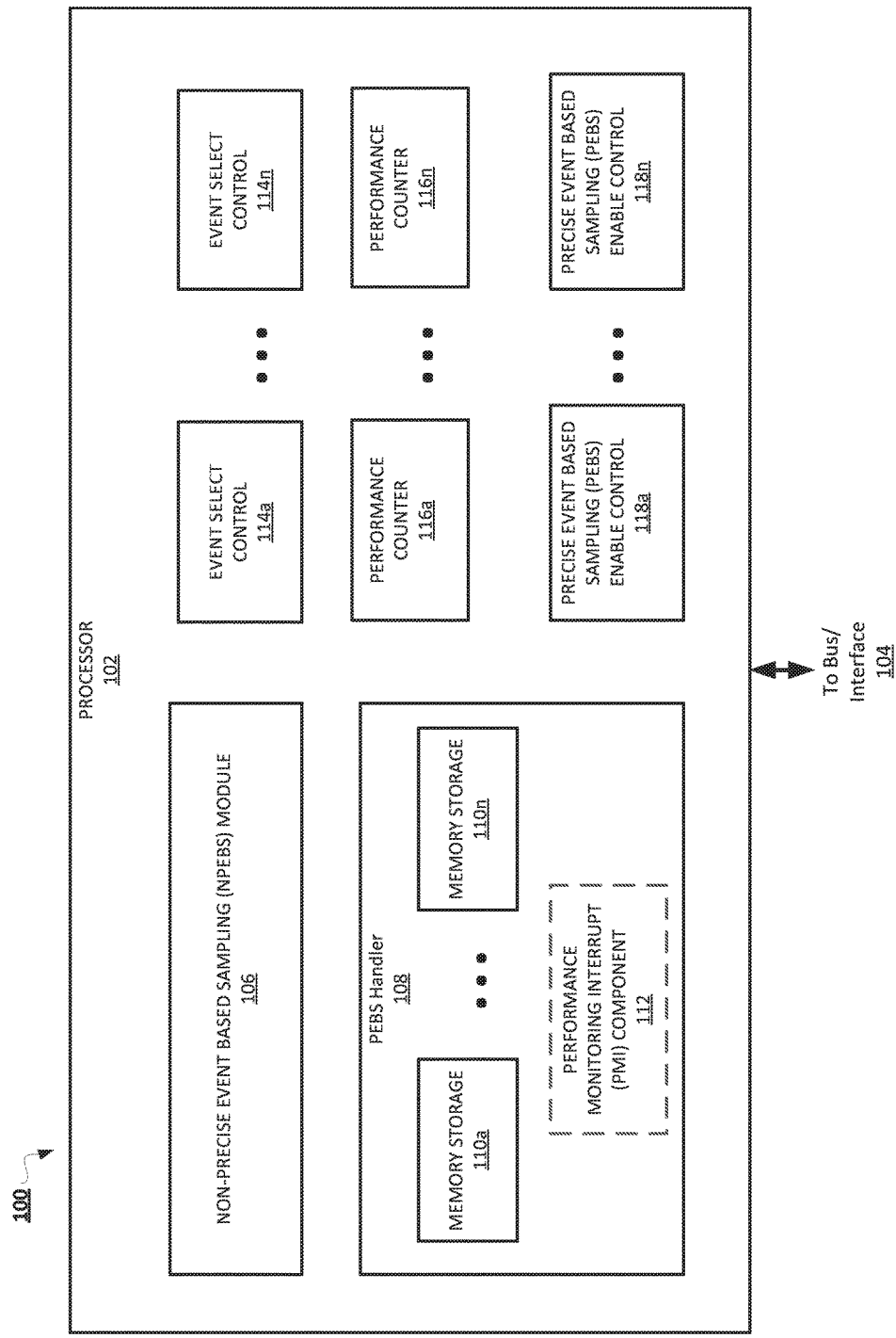
FIG. 1 is a block diagram of system architecture, according to one embodiment of the disclosure.

Disclosed herein are embodiments for monitoring performance of a processing device to manage non-precise event. In some embodiment, the processing device collects non-precise events and stores architectural meta-data regarding the non-precise events in a non-intrusive manner utilizing a mechanism on the processing device without the intervention of a performance monitoring interrupt (PMI).

The operation of a processing device may include the occurrences of a plurality of events that monitor performance of the system. An event includes any operation, occurrence, or action in a processor. In one embodiment, the event is a response to a given instruction and data stream in the processing device. The events may be associated with architectural metadata including state information of the processing device including, but not limited to, an instruction pointer, a time stamp counter, and register state.

In some embodiments, a performance counter is configured to count one or more types of events. While the counter is incrementing, software reads the counter at selected intervals to determine the number of events that have been counted between the intervals. The performance counter may generate a performance record or a performance monitoring interrupt (PMI) when the counter overflows. To trigger an overflow, the counter is preset to a modulus value that may cause the counter to overflow after a specific number of events have been counted, which generates either a PMI or a performance record, such as a precise event based sampling (PEBS) record, as described in detail herein below.

There are several types of mechanisms for monitoring and managing various events. One type is PEBS mechanism, which functions to monitor and manage precise events. A precise event is a performance event that is linked to a specific instruction or micro-operation in an instruction trace and occurs when that instruction or micro-operation retires. Such precise events may include, but are not limited to, instructions retired, branch instructions retired, cache references, or cache misses, to name just a few examples. The PEBS mechanism may include several components, such as an event select (ES) control, performance counter, a PEBS enable control and a PEBS handler. The ES control may programmed with an event identifier, which causes a performance counter corresponding to the ES control to start tracking (e.g., counting occurrences of) the programmed event corresponding to the event identifier.

Embodiments of the present disclosure also include a PEBS enable control of the processing device that controls when a PEBS record is generated. When the PEBS enable control is activated, a PEBS record is stored in a memory of the PEBS handler upon overflow of the performance counter corresponding to the PEBS enable control. In one embodiment, the user activates or sets the PEBS enable control. A PEBS record includes an architectural metadata of a state of the system upon the overflow of the performance counter. Such architectural metadata may include, but is not limited to, an Instruction Pointer (IP), Time Stamp Counter (TSC) and register state. As such, the PEBS record not only allows the location of the precise events in the instruction trace to be accurately profiled, but also provides for additional information for use in software optimization, hardware optimization, performance tuning etc.

Embodiments of the disclosure further utilize the PEBS mechanism to track and manage non-precise events of the processing device. A non-precise event is a performance event that is either not linked to a specific instruction or micro-operation in an instruction trace or can occur speculatively even when the instruction or micro-operation does not retire. By way of example, a non-precise event may include, but is not limited to, reference clockticks, core clockticks, cycles when interrupts are masked, and so on. Previously, the PEBS mechanism would prevent generation of a PEBS record for non-precise events and performance monitoring of such non-precise events was limited to PMIs.

Embodiments of the disclosure introduce a non-precise event based sampling (NPEBS) module of the processing device that allows the PEBS handler to generate a PEBS record for programmed non-precise events and stores this PEBS record for the non-precise event in the memory storage of the PEBS handler. In one example, when the ES control is programmed with a non-precise event identifier and the corresponding PEBS enable control is set to generate a PEBS record for that programmed event, the performance counter associated with the ES control and the PEBS enable control tracks the programmed non-precise event. In one embodiment, the NPEBS module is coupled to the PEBS enable control, which is coupled to the performance counter such that when the performance counter overflows, the NPEBS module causes the PEBS enable control to generate the PEBS record for the non-precise event. Accordingly, the architectural meta-data associated with the non-precise event is captured without requiring a PMI.

In some embodiments, the NPEBS module controls timing of the generation of the PEBS record for the non-precise event. In one embodiment, the PEBS record for the non-precise event is generated immediately upon occurrence of the overflow of the performance counter tracking the non-precise event. In another embodiment, the PEBS record for the non-precise event may be generated immediately after the occurrence of the overflow of the performance counter tracking the non-precise events (e.g., upon execution of next subsequent instruction). In one embodiment, the NPEBS module stores the PEBS record for the non-precise event in memory storage of the PEBS handler.

The above technique of avoiding use of PMI to capture architectural state of the system associated with non-precise events has many advantages. One such advantage is that storing architectural state of the non-precise event in the memory storage in this manner is not inhibited when interrupts are masked. Previously, non-precise events could only pend a PMI instead of logging a PEBS record. Unless the PMI was configured to cause a Non Maskable Interrupt (NMI), the PMI was blocked while interrupts are masked, which obscures where the sample actually occurred. Use of NMIs can cause issues with stability and security on the system and are not allowed by all operating systems. Interrupts are masked in interrupt handlers, context switches, locking algorithms and other critical regions within privileged code (ring0). The amount of time in interrupt handling has increased with the switch toward SoC (Silicon on a Chip) which requires interrupts for interactions between the CPU and intellectual property (IP) units. Many event based sampling profiles are wrong because the PMI handler cannot be taken when interrupts are masked; leading to capture of an incorrect instruction pointer. In embodiments of the disclosure, placing details of an event in the PEBS buffer is not inhibited when interrupts are masked, thus avoiding the drawbacks mentioned above with utilization of a PMI handler.

Another advantage of utilizing a PEBS handler for generation of a PEBS record for non-precise events is faster detection. The buffers of the hardware can be captured to take the instruction pointer (along with additional information on architectural state) with less latency than is required for the interrupt handler to enter upon a PMI. Further advantage is lower overhead on sampling. Multiple PEBS records (some or all may be corresponding to non-precise events) can be collected upon a single PMI to decrease the number of interrupts per sample (i.e., PEBS record) collected. Interrupts are expensive on the system and are responsible for the majority of the performance perturbation caused by event based sampling. Thus, reducing the number of interrupts to obtain performance monitoring samples is advantageous.

Embodiments of the disclosure are compact circuits, and therefore may be implemented as an integral part of a wide range of processing units without incurring significant increase of cost and power consumption. Embodiments of the disclosure are programmable circuit logics, and therefore may be used to track and manage different types of non-precise events on the same circuit logics. The NPEBS module is also extensible to track multiple processing units. The NPEBS module may be shared by a plurality of applications running on a same processor and managed by an operating system (OS) or a virtual machine as a shared resource.

FIG. 1 illustrates a system architecture 100 that includes an NPEBS module 106 and components of a PEBS mechanism according to an embodiment of the present disclosure. In an embodiment, the system architecture may be a system-on-a-chip hardware circuit block that may be implemented on a single die (a same substrate) and within a single semiconductor package. The processing unit may be a central processing unit (CPU) or a graphic processing unit (GPU).

Referring to FIG. 1, the processing unit may include a processor 102 coupled to a bus/interconnect fabric 104. In one embodiment, the processor 102 includes an NPEBS module 106 and a PEBS handler 108 having one or more memory storages 110a to 110n. In one embodiment, the memory storages 110 are physical memory storages such as a buffer. The PEBS handler 108 may also include a performance monitoring interrupt (PMI) component 112. The processor may also include one or more event select (ES) controls 114a to 114n (referred to herein as "ES control 114") corresponding to one or more performance counters 116a to 116n (referred to herein as "performance counter 116") and corresponding to one or more PEBS enable controls 118a to 118n (referred to herein as "PEBS enable control 118"). In some implementations, PEBS enable controls 118a-118n may be located in a single control register (e.g., model specific register).

The processor 102 may include various other known components (not shown) to perform algorithms to process data, in accordance with the present invention. For example, the processor 102 may include a memory (not shown) such as a Level 1 (L1) internal cache. Depending on the architecture, the processor 102 may have a single internal cache or multiple levels of internal cache. Alternatively, in another embodiment, the cache memory may reside external to the processor 102. Other embodiments may also include a combination of both internal and external caches depending on the particular implementation and needs.

Processor 102 may execute a stream of instructions that may be embedded with markers for events that may be placed on a bus/interconnect fabric 104. The execution of a segment of instructions may constitute one or more non-precise events. A non-precise event is a performance event that is either not linked to a specific instruction or micro-operation in an instruction trace or can occur speculatively when the instruction or micro-operation does not retire. Such non-precise events may include, but are not limited to, reference clockticks, core clockticks and cycles, to name a few examples. In one embodiment, the non-precise event is generated by the processor 102. In another embodiment, the non-precise event is generated outside the processor 102 and communicated to the processor via the bus/interconnect fabric 104.

In one embodiment, ES control 114 is programmed with an identifier of a non-precise event. The ES control 114 may be provided as a model specific register (MSR). This programming of the ES control 114 causes a performance counter 116 corresponding to the programmed ES control 114 to track occurrences of the particular programmed non-precise event. In some embodiments, any event that is not defined as a precise event is considered a non-precise event. In one embodiment, the ES control 114 is programmed by an executing application. In another embodiment, a user may program the ES control 114 with the non-precise event identifier.

When the ES control 114 is programmed with a non-precise event identifier, the performance counter 116 corresponding to the ES control 114 is incremented upon each occurrence of the programmed non-precise event. A PEBS enable control 118 corresponding to the ES control 114 and the performance counter 116 may be set (e.g., activated, flag set, bit set to 1, etc.) to generate a PEBS record upon overflow of the performance counter 116. The PEBS enable control 118 may be provided as a MSR. In one embodiment, the user sets the PEBS enable control 118. In one example, the PEBS enable control 118 includes a PEBS_ENABLE bit, which is set to enable the PEBS handler 108 to generate a PEBS record upon overflow of the performance counter 116 that is counting the non-precise event. As discussed above, a PEBS record includes an architectural metadata of a state of the system upon the overflow of the performance counter. The architectural metadata may include, but is not limited to, an IP, TSC, or register state, for example.

In one embodiment, the NPEBS module 106 is coupled to the PEBS enable control 118 such that when the performance counter 116 overflows, the NPEBS module 106 causes the PEBS enable control 118 to generate the PEBS record for the non-precise event. In some embodiments, the NPEBS module 106 controls timing of generation of the PEBS record for the non-precise event. For example, in one embodiment, the NPEBS module 106 may cause the PEBS enable control 118 to generate the PEBS record for the non-precise event immediately upon occurrence of the overflow of the performance counter 116 tracking and counting the programmed non-precise event.

In another embodiment, the NPEBS module 106 may cause the PEBS enable control 118 to generate the PEBS record for the non-precise event immediately after the occurrence of the overflow of the performance counter 116 tracking and counting the programmed non-precise event. In this embodiment, the PEBS record is generated after the next instruction that retires (i.e., after completion of the next instruction in the instruction trace that triggered the performance counter 116 to overflow). In one embodiment, the PEBS record generated for the non-precise event by PEBS handler 108 is stored in memory storage 110 of the PEBS handler 108. Accordingly, the architectural meta-data associated with the non-precise event is captured without utilizing a PMI.

In one embodiment, the PMI component 112 may function to collect the PEBS records stored in the memory storage(s) 110a-110n of PEBS handler 108. The PMI component 112 may immediately collect the PEBS records stored in the memory storage 110a-110n. In another embodiment, the PMI component 112 may be delayed in collecting the PEBS records in memory storages 110a-110n at once. The interface may be provided as a model specific register (MSR).

Figure 2A:
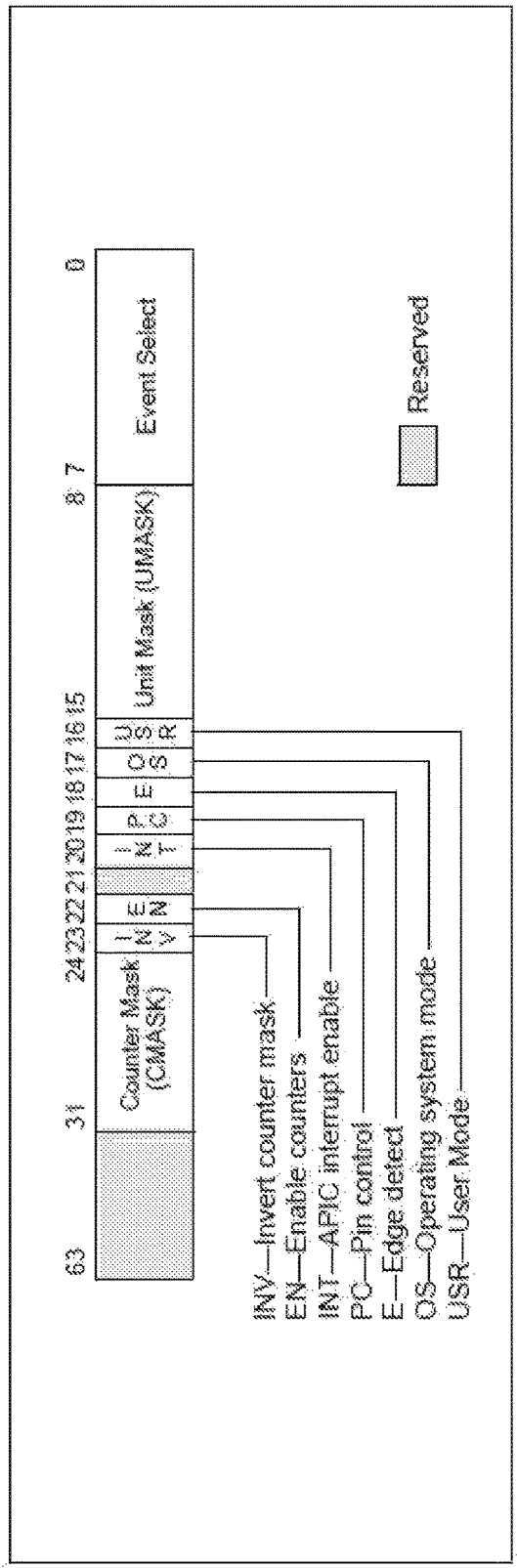
FIG. 2A illustrates a layout of bit fields for model specific register according to one embodiment of the disclosure.

FIG. 2A illustrates exemplary layout 200 of bit fields for event select (ES) control MSR in accordance with one embodiment of the present invention. The ES control MSR may be the same as ES control 114 described with respect to FIG. 1. The layout 200 of the ES control MSR may provide a comprehensive, standardized layout for utilizing event select controls and performance counters as the MSRs in the processor to manage events. In an embodiment, the layout 200 may be a register(s) file, which may include individual bit positions corresponding to each component in the processor. The layout 200 may include event select bits 0 through 7 to identify the events generated in the processing device. As discussed above, an event may be a precise event or a non-precise event.

The layout 200 may also include unit mask (UMASK) bits 8 through 15, each of which define a specific architectural state information of the processing device. The layout 200 may also include a user mode (USR) bit 16, which specifies the selected architectural state is counted only when the processor is operating at privilege levels, for example, levels 1, 2 or 3. The layout 200 may also include an operating system (OS) mode bit 17, which specifies that the selected architectural state is counted only when the processor is operating at the privilege level 0. In one example, the OS mode bit 17 may be with the USR bit 16.

The layout 200 may also include an edge detect (E) bit 18, which enables (when set) edge detection of the selected architectural state. The processor may count the number of deasserted to asserted transitions for any state that may be expressed by the other bits. In one embodiment, such mechanism does not permit back-to-back assertions to be distinguished and allows software to measure not only the fraction of time spent in a particular state, but also the average length of time spent in such a state (for example, the time spent waiting for an interrupt to be serviced). The layout 200 may further include a pin control (PC) bit 19, which when set causes the processor to toggle PMI pins and increments the performance counter when performance monitoring events occur and when clear, the processor toggles the PMI pins when the performance counter overflows. The toggling of a pin is defined as assertion of the pin for a single bus clock followed by deassertion.

The layout 200 may further include an advanced programmable interrupt controller (APIC) interrupt enable (INT) bit 20, which when set, causes the processor to generate an exception through its local APIC on the performance counter overflow. The layout 200 may further include an enable counter (EN) bit 22, which, when set, causes the performance counter to be enabled in the corresponding performance counter. The performance counter may be the same as performance counter 116 described with respect to FIG. 1. When the EN bit 22 is cleared, the corresponding performance counter is disabled. In one embodiment, the event logic unit for a counter-mask (CMASK) is disabled by setting the EN bit 23 to 0 before writing into the performance counter. The layout 200 may further include an invert (INV) bit 23, which when set, inverts the counter-mask (CMASK) comparison, so that both greater than or equal to and less than comparisons can be made (For example, 0: greater than or equal; 1: less than).

In one embodiment, when the counter-mask bits are programmed to zero, INV bit 23 is ignored. The layout 200 may further include the counter-mask (CMASK) bits 24 to 31, which when are not zero, the processor compares this mask to the events count of the detected architectural state during a single cycle. In one embodiment, if the event count is greater than or equal to this mask, the performance counter is incremented by one. In one embodiment, when the event count is less than this mask, the performance counter is not incremented. In one embodiment, the CMASK bit is intended for software to characterize architectural states that can count multiple occurrences per cycle (for example, two or more instructions retired per clock; or bus queue occupations). If the CMASK bit is 0, then the performance counter is incremented each cycle by the event count associated with multiple occurrences.

Figure 2B:
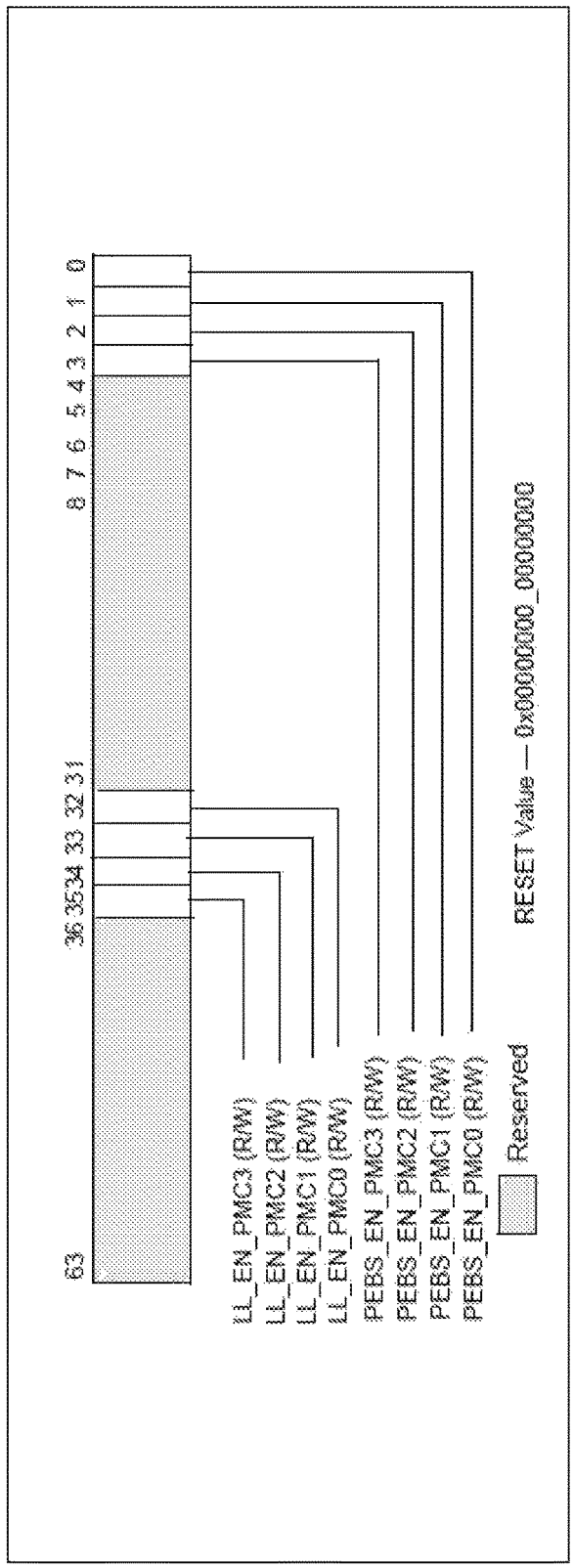
FIG. 2B illustrates a layout of bit fields for model specific register according to one embodiment of the disclosure.

FIG. 2B illustrates exemplary layout 202 of bit fields for the PEBS enable control MSR in accordance with one embodiment of the present invention. In one embodiment, the PEBS control MSR is the same as PEBS enable control 118 described with respect to FIG. 1. The layout 202 may provide a comprehensive, standardized layout for utilizing the PEBS enable control as the MSR in the processor to manage events. In an embodiment, the layout 202 may be a register(s) file, which may include individual bit positions corresponding to each component in the processor. The layout 202 may include PEBS enable control bits 0 through 3 (PEBS_EN_PMC0, PEBS_EN_PMC1, PEBS_EN_PMC2, PEBS_EN_PMC3), which are enabled to indicate when an overflow condition in a particular performance counter (e.g., performance counter 116 of FIG. 1) causes a PEBS record to be generated and stored in memory storage of the PEBS handler (e.g., PEBS handler 108 of FIG. 1). The layout 202 may also include bits 32-35 (LL_EN_PMC0, LL_EN_PMC0, LL_EN_PMC0, LL_EN_PMC0), which allow the PEBS record to capture latency information upon overflow condition of the performance counter.

Figure 3:
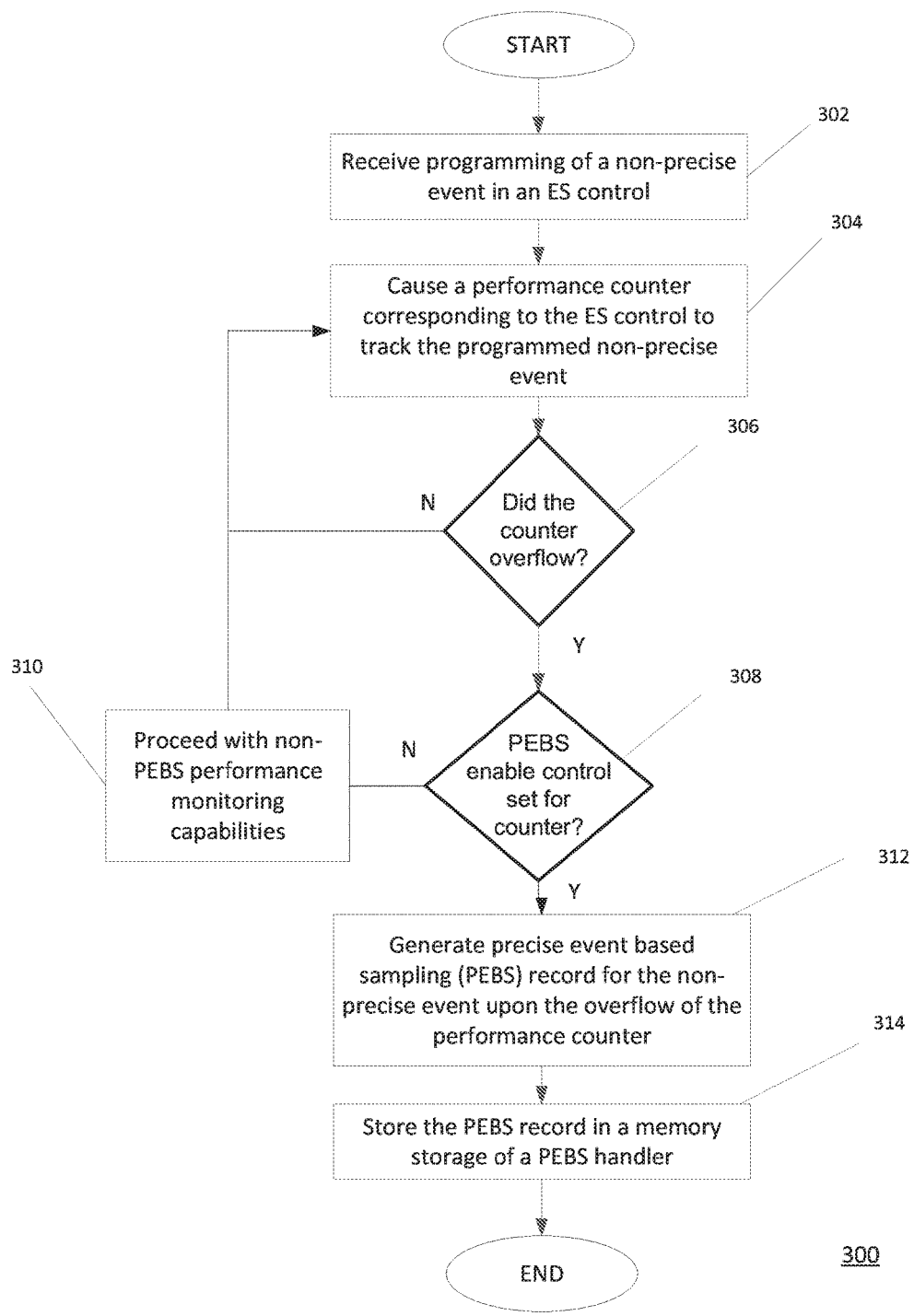
FIG. 3 is a flow diagram of a method for monitoring performance of a processing device to manage non-precise events according to one embodiment of the disclosure.

FIG. 3 is a flow diagram of a method for monitoring performance of a processing device to manage non-precise events according to an embodiment of the disclosure. Method 300 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 300 may be performed, in part, by processor 102 described above with respect to FIG. 1.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

Referring to FIG. 3, at 302 the processing logic receives programming of non-precise event in an ES control. In one embodiment, a non-precise event is a performance event that is either not linked to a specific instruction or micro-operation in an instruction trace or can occur speculatively even then the instruction or micro-operation does not retire. The non-precise event may include, but is not limited to, reference clockticks, core clockticks and cycles. As discussed above, in one embodiment, the non-precise event is generated in the processor. In another embodiment, the non-precise event is generated outside the processor and the processing logic may detect the non-precise event by monitoring an interconnect fabric on which events may place alarm signals. At block 304, a performance counter corresponding to the ES control is caused to track the programmed non-precise event. For example, a value in the performance counter counting the non-precise events may be incremented upon each occurrence of the non-precise event.

At block 306, it is determined whether the performance counter overflowed. When it is determined at block 306 that the performance counter did not overflow, block 304 is repeated for the performance counter to continue tracking the non-precise event. When it is determined at block 306 that the performance counter did overflow, then method 300 proceeds to decision block 308 where it is determined whether a PEBS enable control is set for the performance counter. If the PEBS enable control is not set, then method 300 proceeds to block 310 where non-PEBS performance monitoring capabilities are performed. Method 300 then returns to block 304 to repeat the tracking of the non-precise event occurrences.

On the other hand, if the PEBS enable control for the performance counter is set, then method 300 continues to block 312 where a PEBS record for the non-precise events is generated upon the overflow. In one embodiment, the PEBS record for the non-precise event is generated immediately upon occurrence of the overflow of the performance counter counting the non-precise events. In another embodiment, the PEBS record for the non-precise event is generated immediately after the occurrence of the overflow of the performance counter counting the non-precise events. In this embodiment, the PEBS record is generated after the next instruction that retires, i.e. after completion of the next instruction in the instruction trace that triggered the performance counter to overflow.

The PEBS record may include an architectural metadata of a state of the processing device upon the overflow of the performance counter. The architectural metadata may include, but is not limited to, an IP, a TSC, and register state, to name a few examples. As such, the architectural metadata of a processing device associated with a non-precise event may be quickly captured without utilizing a PMI. At block 314, the generated PEBS record for the non-precise event is stored in a memory storage of the PEBS handler.

Figure 4A:
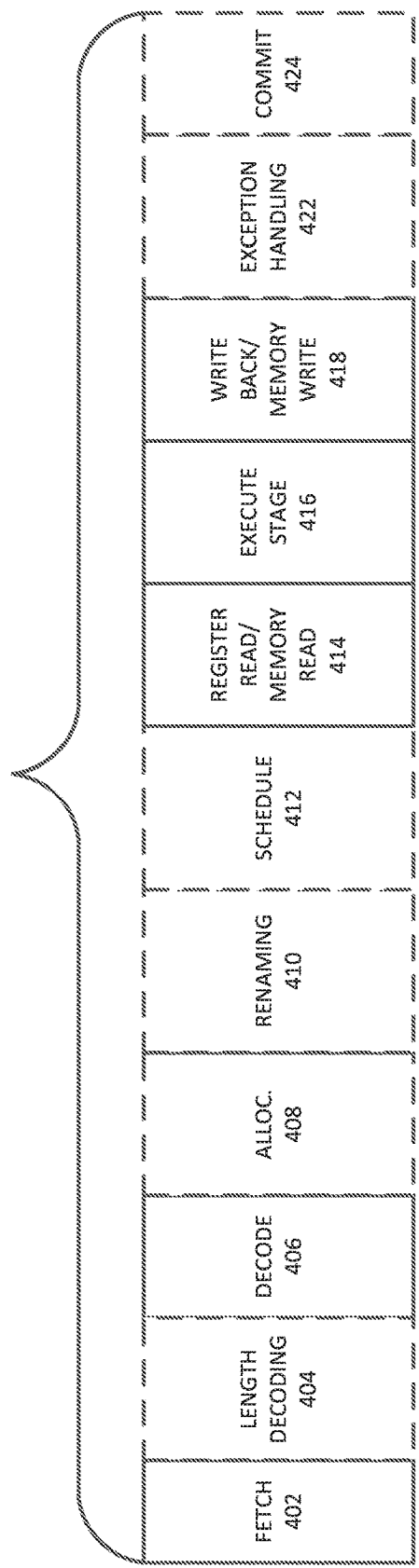
FIG. 4A is a block diagram illustrating an exemplary in order pipeline and an exemplary register renaming, out-of-order issue/execution pipeline in accordance with described embodiments.
Figure 4B:
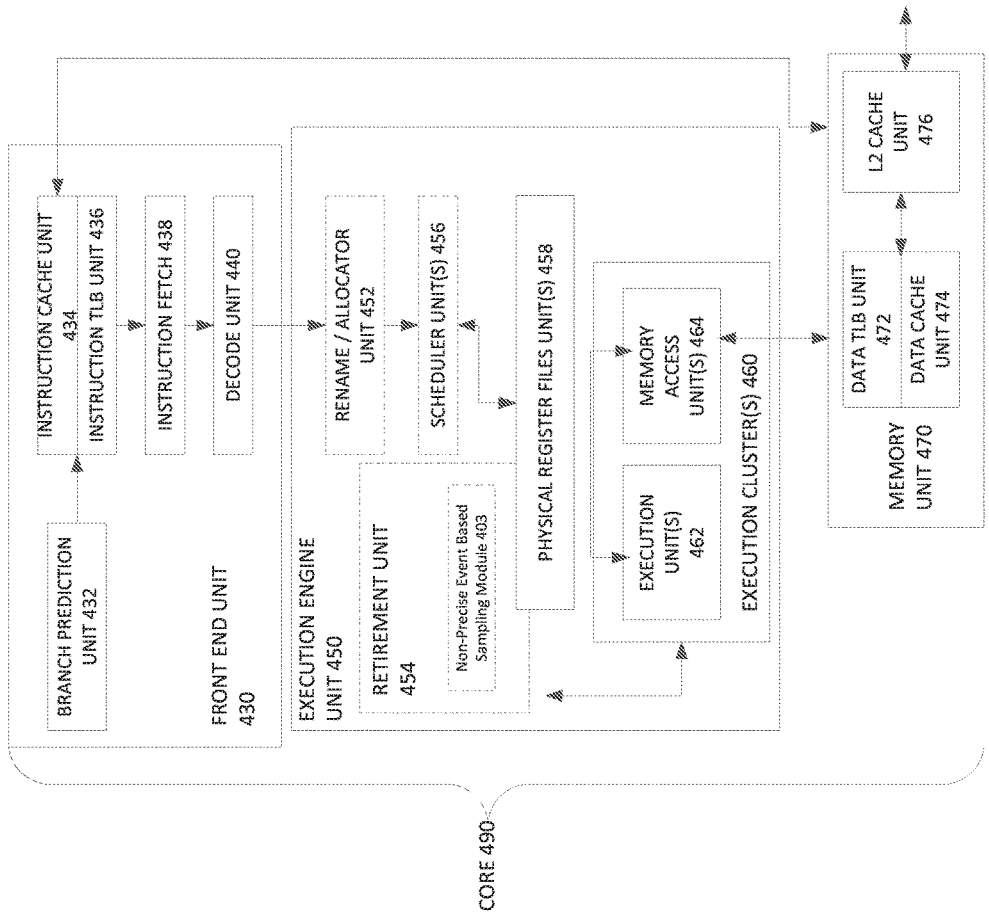
FIG. 4B is a block diagram illustrating both an exemplary embodiment of an in-order architecture core and an exemplary register renaming, out-of-order issue/execution architecture core to be included in a processor in accordance with described embodiments.

FIG. 4A is a block diagram illustrating an in-order pipeline and a register re-naming stage, out-of-order issue/execution pipeline of a processor monitoring performance of a processing device to manage non-precise events according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/ execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424. In some embodiments, the stages are provided in a different order and different stages may be considered in-order and out-of-order.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 70.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/ allocator unit 452 coupled to a retirement unit 454 and a set of one or more scheduler unit(s) 456. The retirement unit 454 may include a non-precise event based sampling (NPEBS) module 403 to monitor performance of a processing device to manage non-precise events according to embodiments of the invention. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point).

While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 38 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
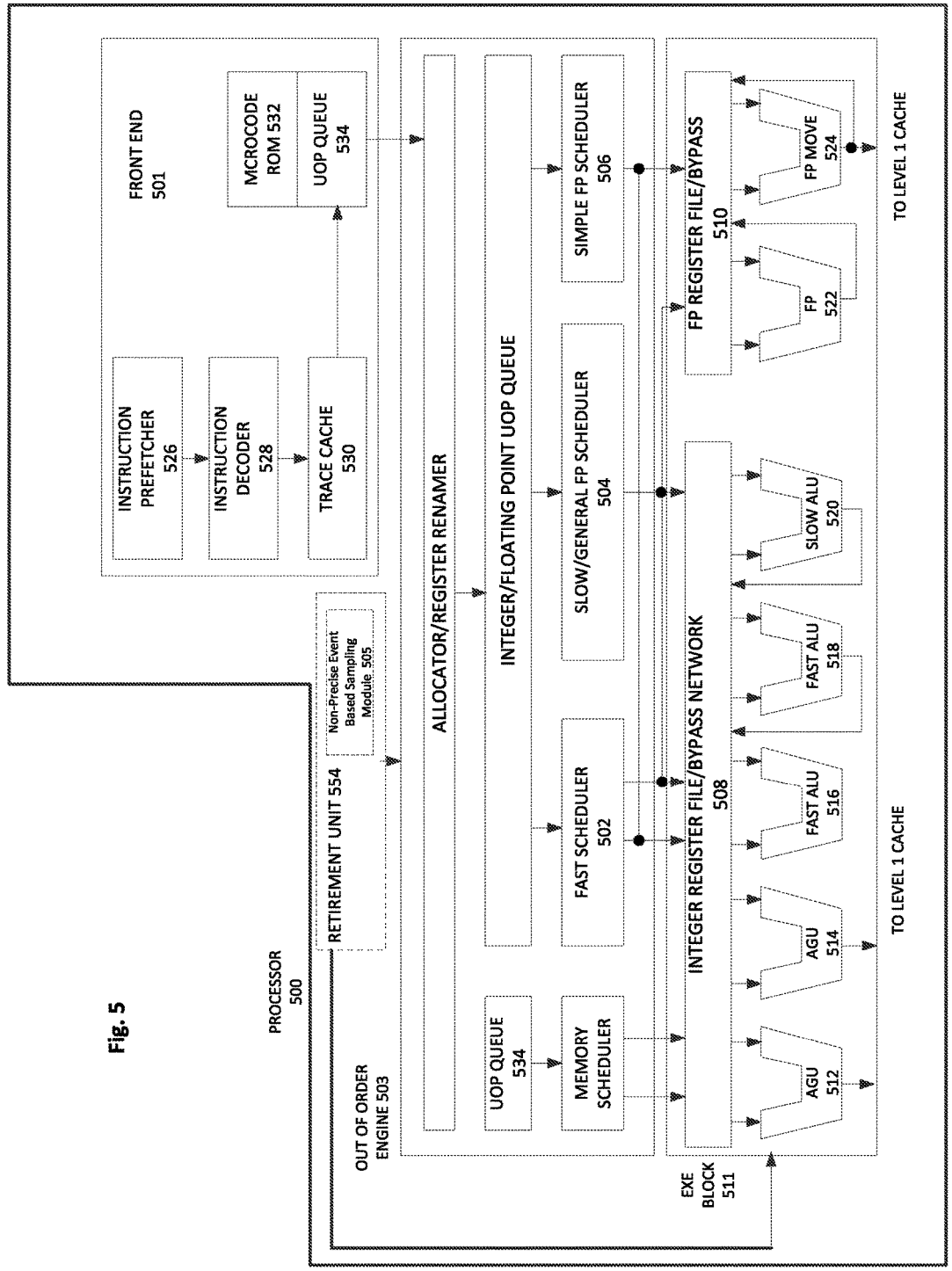
FIG. 5 is a block diagram illustrating a processor according to one embodiment.

FIG. 5 is a block diagram illustrating a micro-architecture for a processor 500 that includes logic circuits to perform instructions in accordance with one embodiment of the invention. In one embodiment, processor 500 monitors performance of a processing device to manage non-precise events. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline. The front end 501 may include several units. In one embodiment, the instruction prefetcher 526 fetches instructions from memory and feeds them to an instruction decoder 528, which in turn decodes or interprets them. For example, in one embodiment, the decoder decodes a received instruction into one or more operations called "micro-instructions" or "micro-operations" (also called micro op or uops) that the machine can execute.

In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others use several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one embodiment from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506 determine when a uop is ready to execute based on the readiness of their dependent input register operand sources and the availability of the execution resources the uops use to complete their operation. The fast scheduler 502 of one embodiment can schedule on each half of the main clock cycle while the other schedulers can schedule once per main processor clock cycle. The schedulers arbitrate for the dispatch ports to schedule uops for execution.

Register files 508, 510 sit between the schedulers 502, 504, 506, and the execution units 512, 514, 516, 518, 520, 522, 524 in the execution block 511. There is a separate register file for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 66 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions use to execute. The processor 500 of one embodiment is comprised of a number of execution units: address generation unit (AGU) 512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64 bit by 54 bit floating point divider to execute divide, square root, and remainder micro-ops. For embodiments of the invention, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520 are described in the context of performing integer operations on 64 bit data operands. In alternative embodiments, the ALUs 516, 518, 520 can be implemented to support a variety of data bits including 16, 32, 128, 256, etc. Similarly, the floating point units 522, 524 can be implemented to support a range of operands having bits of various widths. For one embodiment, the floating point units 522, 524 can operate on 128 bits wide packed data operands in conjunction with SIMD and multimedia instructions.

In one embodiment, the uops schedulers 502, 504, 506 dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The processor 500 may include a retirement unit 554 coupled to the execution block 511. The retirement unit 554 may include a NPEBS module 505 to monitor performance of a processing device to manage non-precise events according to embodiments of the invention.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data.

A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not differentiate between the two data types. In one embodiment, integer and floating point are contained in either the same register file or different register files. Furthermore, in one embodiment, floating point and integer data may be stored in different registers or the same registers.

Figure 6:
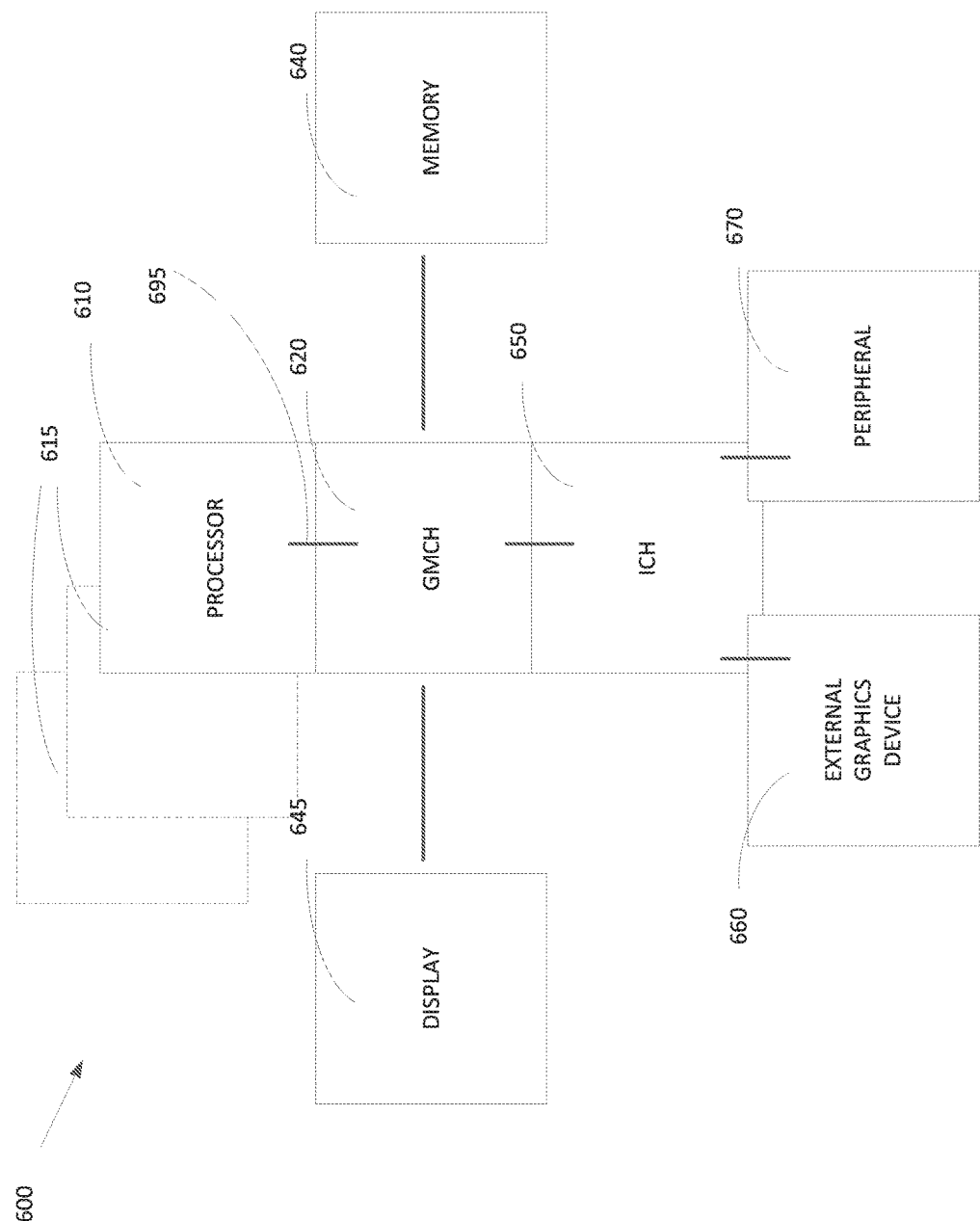
FIG. 6 illustrates a block diagram of a computer system according to one embodiment.

Referring now to FIG. 6, shown is a block diagram of a system 600 in accordance with one embodiment of the invention. The system 600 may include one or more processors 610, 615, which are coupled to graphics memory controller hub (GMCH) 620. The optional nature of additional processors 615 is denoted in FIG. 6 with broken lines. In one embodiment, a processor 610, 615 monitors performance of a processing device to manage non-precise events.

Each processor 610, 615 may be some version of the circuit, integrated circuit, processor, and/or silicon integrated circuit as described above. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the processor(s) 610, 615 in terms of a spectrum of metrics of merit including architectural, micro-architectural thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
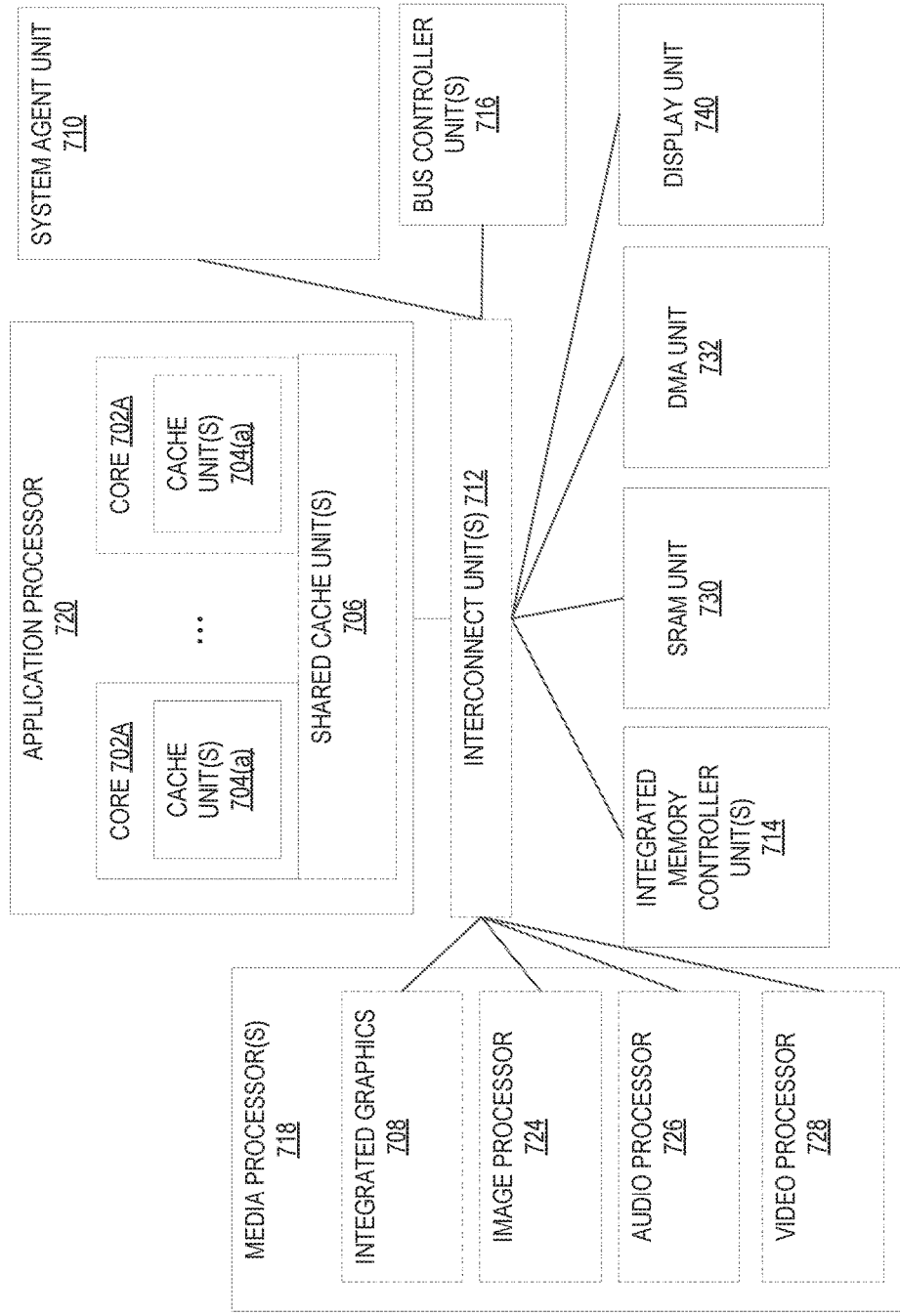
FIG. 7 is a block diagram of a system on chip (SoC) in accordance with an embodiment of the present disclosure.

Embodiments may be implemented in many different system types. FIG. 7 is a block diagram of a SoC 700 in accordance with an embodiment of the present disclosure. Dashed lined boxes are optional features on more advanced SoCs. In FIG. 7, an interconnect unit(s) 712 is coupled to: an application processor 720 which includes a set of one or more cores 702A-N and shared cache unit(s) 706; a system agent unit 710; a bus controller unit(s) 716; an integrated memory controller unit(s) 714; a set or one or more media processors 718 which may include integrated graphics logic 708, an image processor 724 for providing still and/or video camera functionality, an audio processor 726 for providing hardware audio acceleration, and a video processor 728 for providing video encode/decode acceleration; an static random access memory (SRAM) unit 730; a direct memory access (DMA) unit 732; and a display unit 740 for coupling to one or more external displays. In one embodiment, a memory module may be included in the integrated memory controller unit(s) 714. In another embodiment, the memory module may be included in one or more other components of the SoC 700 that may be used to access and/or control a memory. The application processor 720 may include a conditional branch, indirect branch and event execution logics as described in embodiments herein.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof.

In some embodiments, one or more of the cores 702A-N are capable of multi-threading.

The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture and/or instruction set. For example, some of the cores 702A-N may be in order while others are out-of-order. As another example, two or more of the cores 702A-N may be capable of execution the same instruction set, while others may be capable of executing only a subset of that instruction set or a different instruction set.

The application processor 720 may be a general-purpose processor, such as a Core™ i3, i5, i7, 2 Duo and Quad, Xeon™, Itanium™, Atom™, XScale™ or StrongARM™ processor, which are available from Intelυ Corporation, of Santa Clara, Calif. Alternatively, the application processor 720 may be from another company, such as ARM Holdings™, Ltd, MIPS™, etc. The application processor 720 may be a special-purpose processor, such as, for example, a network or communication processor, compression engine, graphics processor, co-processor, embedded processor, or the like. The application processor 720 may be implemented on one or more chips. The application processor 720 may be a part of and/or may be implemented on one or more substrates using any of a number of process technologies, such as, for example, BiCMOS, CMOS, or NMOS.

Figure 8:
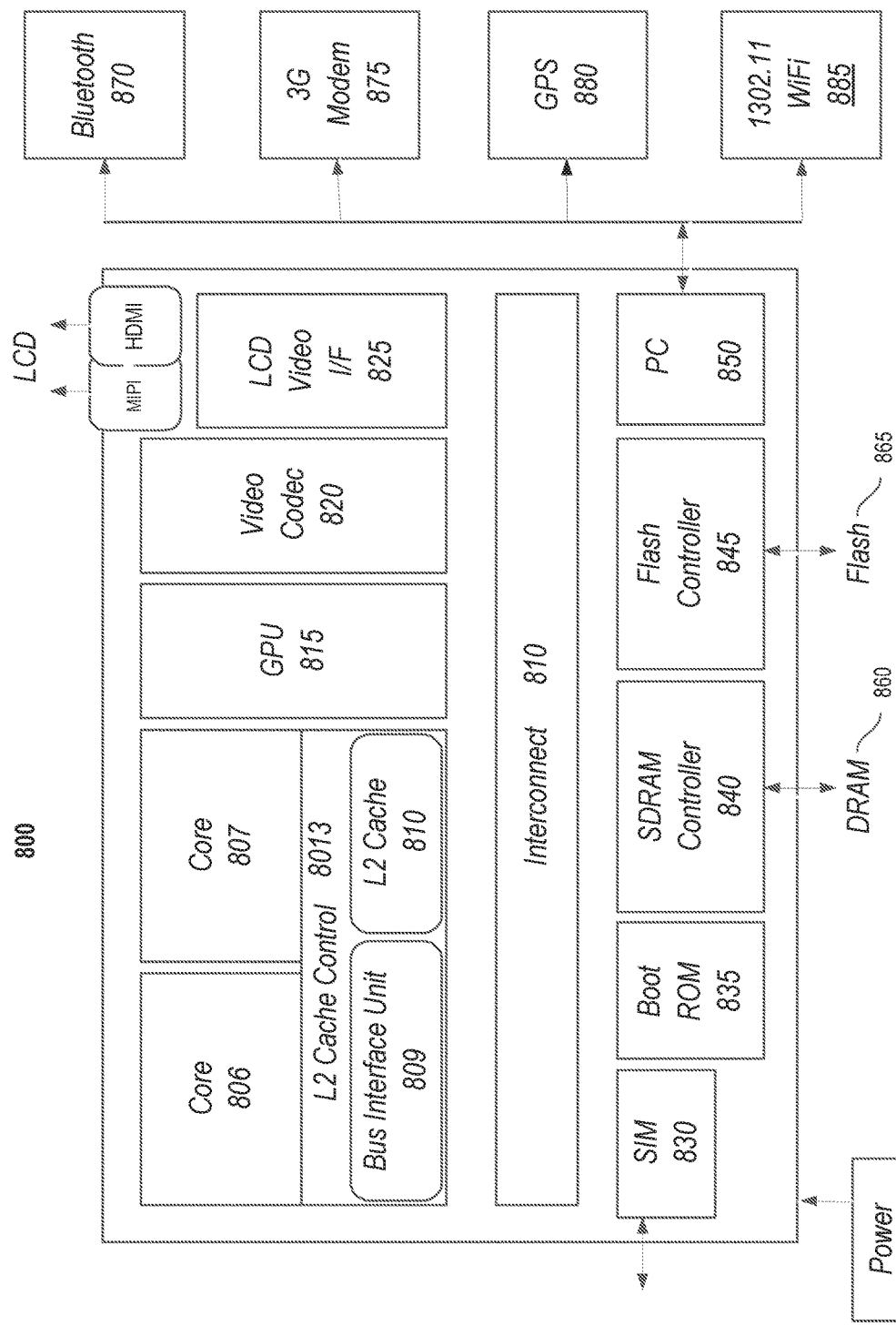
FIG. 8 is a block diagram of an embodiment of a system on-chip (SOC) design.

FIG. 8 is a block diagram of an embodiment of a system on-chip (SoC) design in accordance with the present disclosure. As a specific illustrative example, SoC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 800 includes 2 cores-806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 808 and L2 cache 810 to communicate with other parts of system 800. Interconnect 810 includes an on-chip interconnect, such as an IOSF, AMBA, or other interconnect discussed above, which potentially implements one or more aspects of the described disclosure. In one embodiment, a conditional branch, indirect branch and event execution logics may be included in cores 806, 807.

Interconnect 810 provides communication channels to the other components, such as a Subscriber Identity Module (SIM) 830 to interface with a SIM card, a boot ROM 835 to hold boot code for execution by cores 806 and 807 to initialize and boot SoC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the disclosure described herein. In addition, the system 800 illustrates peripherals for communication, such as a Bluetooth module 870, 3G modem 875, GPS 880, and Wi-Fi 885.

Figure 9:
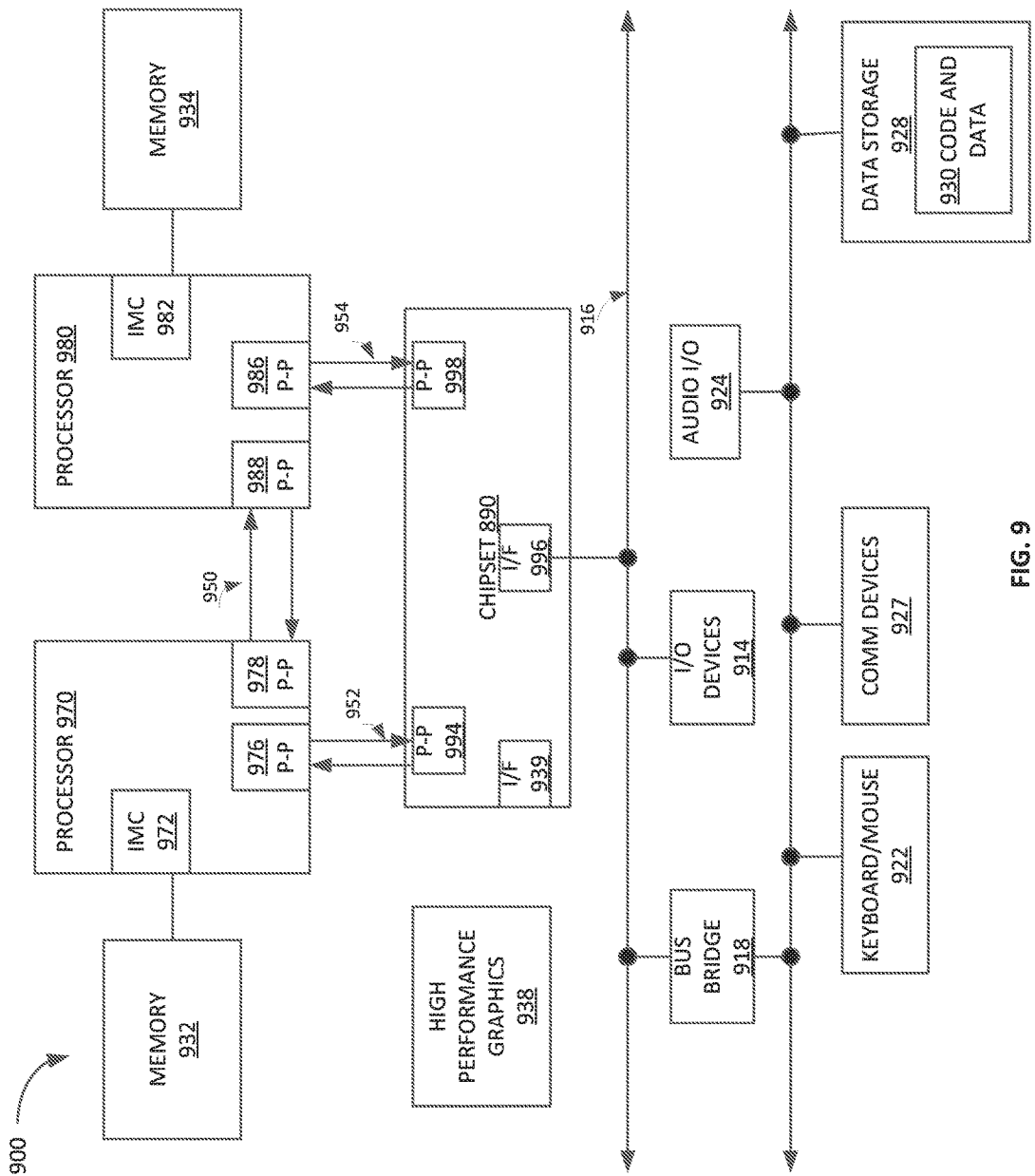
FIG. 9 illustrates a block diagram of a computer system according to one embodiment.

Referring now to FIG. 9, shown is a block diagram of a system 900 in accordance with an embodiment of the invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processors of the computing systems as described herein. In one embodiment, processors 970, 980 monitoring performance of a processing device to manage non-precise events to monitor performance of a processing device to manage non-precise events.

While shown with two processors 970, 980, it is to be understood that the scope of the disclosure is not so limited. In other embodiments, one or more additional processors may be present in a given processor.

Processors 970 and 980 are shown including integrated memory controller units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970 and 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the disclosure is not so limited.

As shown in FIG. 9, various I/O devices 914 may be coupled to first bus 916, along with a bus bridge 918, which couples first bus 916 to a second bus 920. In one embodiment, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to second bus 920. Note that other architectures are possible. For example, instead of the point-to-point architecture of FIG. 9, a system may implement a multi-drop bus or other such architecture.

Figure 10:
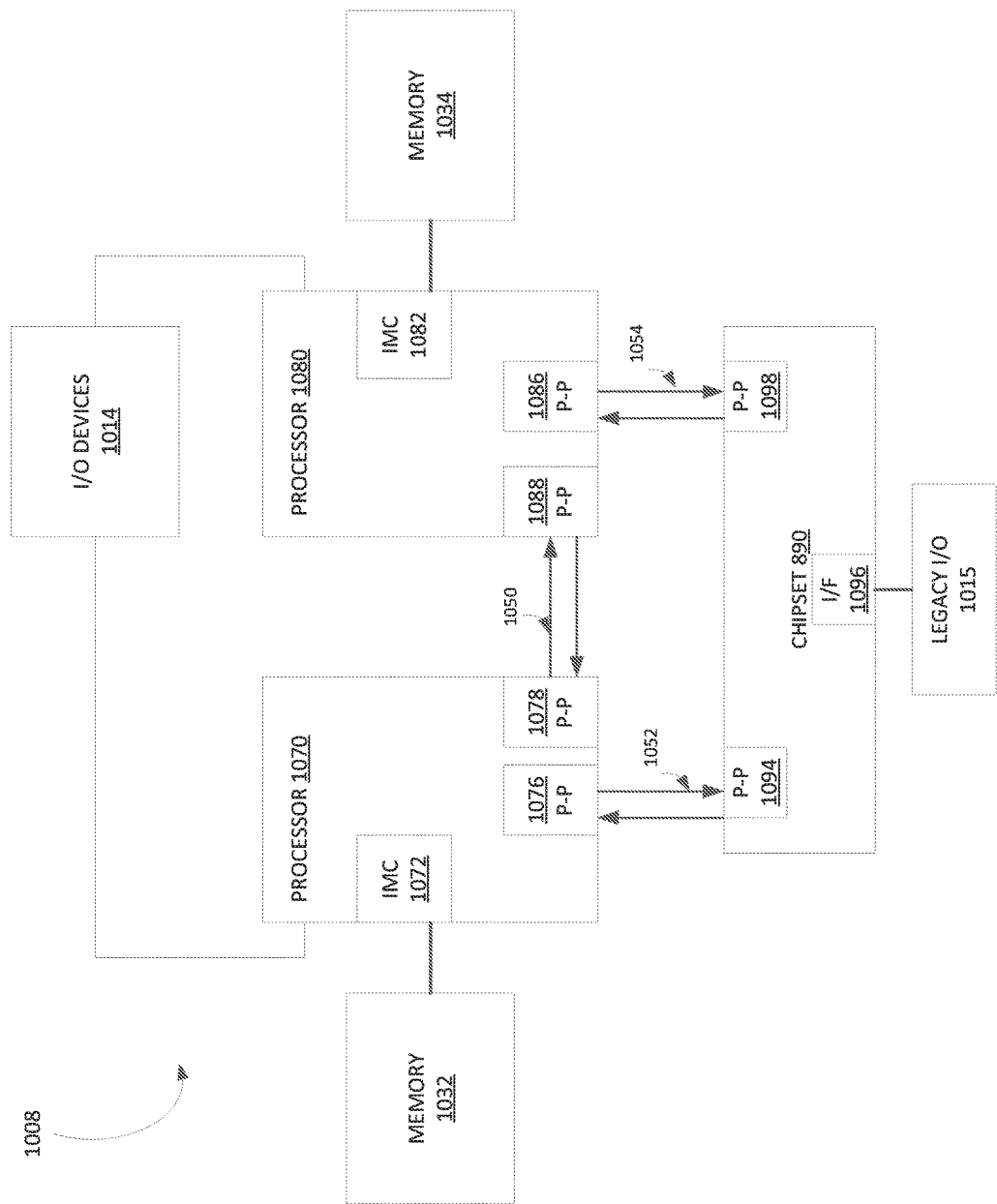
FIG. 10 illustrates a block diagram of a computer system according to one embodiment.

Referring now to FIG. 10, shown is a block diagram of a system 1000 in accordance with an embodiment of the invention. FIG. 10 illustrates processors 1070, 1080. In one embodiment, processors 1070, 1080 monitor performance of a processing device to manage non-precise events. Furthermore, processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnect 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096.

Figure 11:
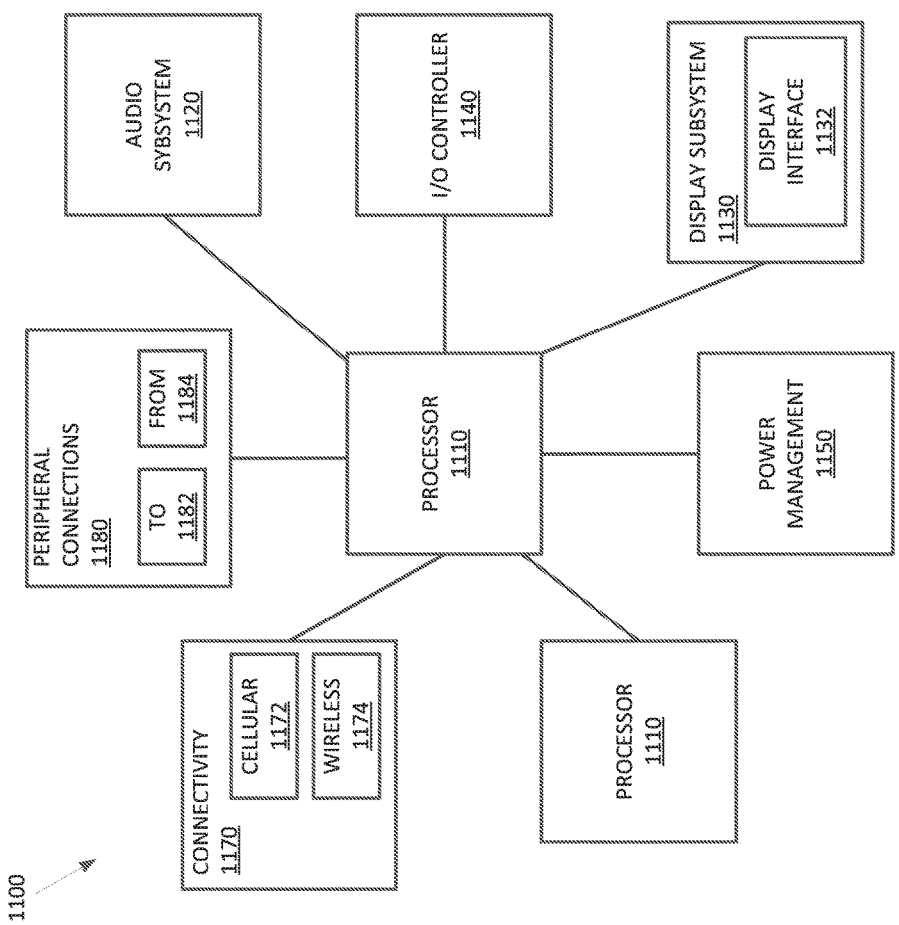
FIG. 11 illustrates block diagram of an embodiment of tablet computing device, a smartphone, or other mobile device in which touchscreen interface connectors are used.

FIG. 11 illustrates a block diagram 1100 of an embodiment of tablet computing device, a smartphone, or other mobile device in which touchscreen interface connectors may be used. Processor 1110 may monitor performance of a processing device to manage non-precise events. In addition, processor 1110 performs the primary processing operations. Audio subsystem 1120 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 1110.

Display subsystem 1132 represents hardware (e.g., display devices) and software (e.g., drivers) components that provide a visual and/or tactile display for a user to interact with the tablet computing device or smartphone. Display subsystem 1130 includes display interface 1132, which includes the particular screen or hardware device used to provide a display to a user. In one embodiment, display subsystem 1130 includes a touchscreen device that provides both output and input to a user.

I/O controller 1140 represents hardware devices and software components related to interaction with a user. I/O controller 1140 can operate to manage hardware that is part of audio subsystem 1120 and/or display subsystem 1130. Additionally, I/O controller 1140 illustrates a connection point for additional devices that connect to the tablet computing device or smartphone through which a user might interact. In one embodiment, I/O controller 1140 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 1150 that manages battery power usage, charging of the battery, and features related to power saving operation. Memory subsystem 1160 includes memory devices for storing information in the tablet computing device or smartphone. Connectivity 1170 includes hardware devices (e.g., wireless and/or wired connectors and communication hardware) and software components (e.g., drivers, protocol stacks) to the tablet computing device or smartphone to communicate with external devices. Cellular connectivity 1172 may include, for example, wireless carriers such as GSM (global system for mobile communications), CDMA (code division multiple access), TDM (time division multiplexing), or other cellular service standards). Wireless connectivity 1174 may include, for example, activity that is not cellular, such as personal area networks (e.g., Bluetooth), local area networks (e.g., WiFi), and/or wide area networks (e.g., WiMax), or other wireless communication.

Peripheral connections 1180 include hardware interfaces and connectors, as well as software components (e.g., drivers, protocol stacks) to make peripheral connections as a peripheral device ("to" 1182) to other computing devices, as well as have peripheral devices ("from" 1184) connected to the tablet computing device or smartphone, including, for example, a "docking" connector to connect with other computing devices. Peripheral connections 1180 include common or standards-based connectors, such as a Universal Serial Bus (USB) connector, DisplayPort including MiniDisplayPort (MDP), High Definition Multimedia Interface (HDMI), Firewire, etc.

Figure 12:
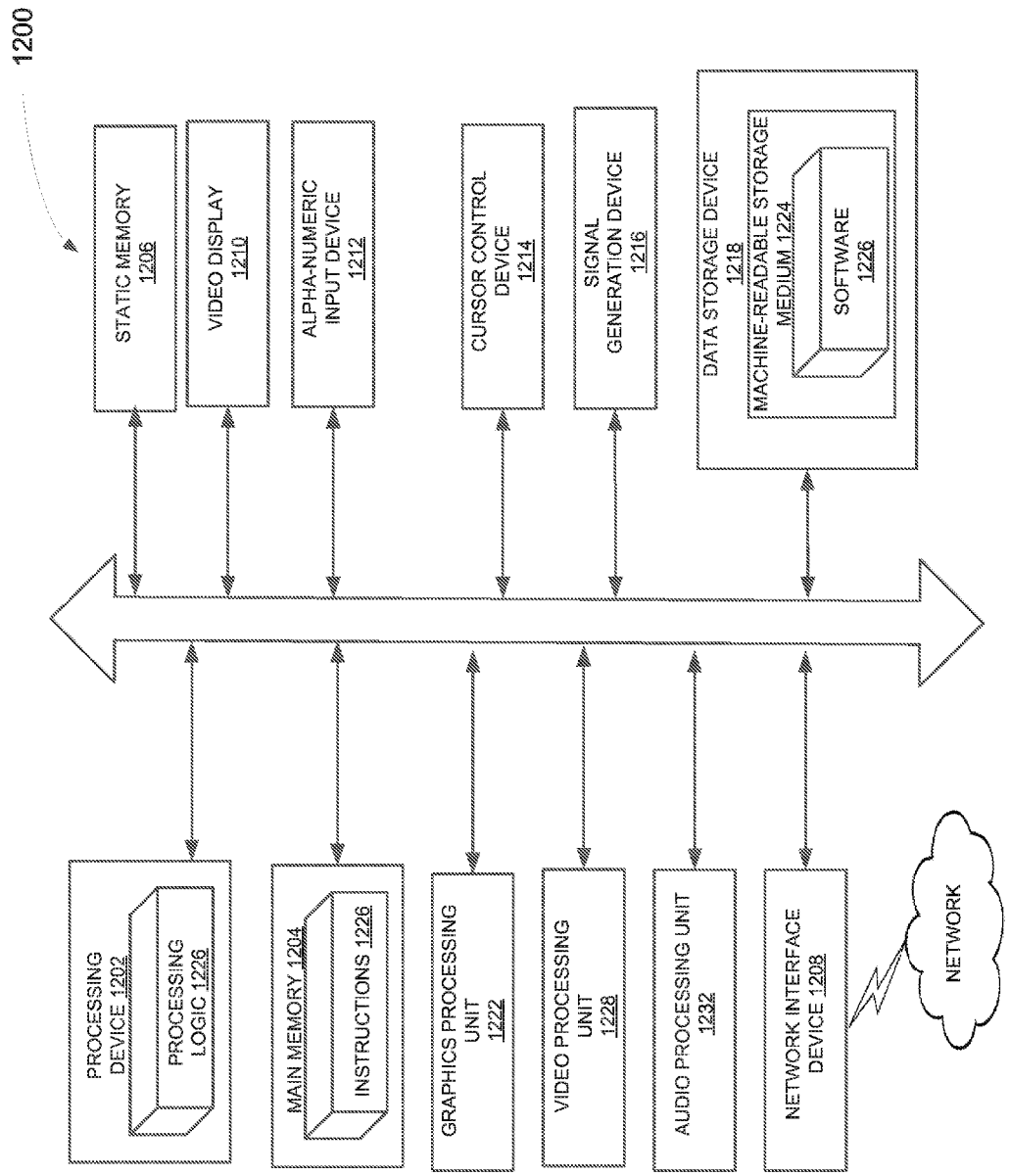
FIG. 12 illustrates a diagrammatic representation of a machine in the example form of a computer system within which a set of instructions, for causing the machine to perform any one or more of the methodologies discussed herein, may be executed.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 is the same as computer systems 100 and 200 as described with respect to FIG. 1 that implements the NPEBS module 106. Alternatively, the computing system 1200 can include other components as described herein.

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the NPEBS module 106 described with respect to FIG. 1 and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the embodiments. The term "computer-readable storage medium" shall accordingly be taken to include, but not be limited to, solid-state memories, and optical and magnetic media. While the invention has been described with respect to a limited number of embodiments, those skilled in the art will appreciate numerous modifications and variations therefrom. It is intended that the appended claims cover all such modifications and variations as fall within the true spirit and scope of this invention.

The following examples pertain to further embodiments.

Example 1 is a processing device monitoring performance of a processing device to manage non-precise events comprising a performance counter to increment upon occurrence of a non-precise event in the processing device; a precise event based sampling (PEBS) enable control communicably coupled to the performance counter; a PEBS handler to generate and store a PEBS record comprising architectural metadata defining a state of the processing device at a time of generation of the PEBS record; and a non-precise event based sampling (NPEBS) module communicably coupled to the PEBS enable control and the PEBS handler, the NPEBS module to cause the PEBS handler to generate the PEBS record for the non-precise event upon overflow of the performance counter.

In Example 2, the subject matter of Example 1 can optionally include an event select (ES) control communicably coupled to the performance counter, wherein the ES control is programmed with an identifier of the non-precise event.

In Example 3, the subject matter of any one of Examples 1-2 can optionally include wherein the non-precise event is a performance event that is not associated with an instruction in an instruction trace, wherein the non-precise event occurs when the instruction does not retire.

In Example 4, the subject matter of any one of Examples 1-3 can optionally include wherein the PEBS record for the non-precise event is generated when the PEBS enable control is set for the performance counter.

In Example 5, the subject matter of any one of Examples 1-4 can optionally include wherein the NPEBS module further to cause the PEBS handler to generate the PEBS record for the non-precise event immediately upon occurrence of the overflow of the performance counter.

In Example 6, the subject matter of any one of Examples 1-5 can optionally include wherein the NPEBS module further to cause the PEBS handler to generate the PEBS record for the non-precise event immediately after occurrence of the overflow of the performance counter.

In Example 7, the subject matter of any one of Examples 1-6 can optionally include wherein the PEBS handler comprises a memory storage to store the PEBS record generated for the non-precise event.

In Example 8, the subject matter of any one of Examples 1-7 can optionally include wherein the non-precise event is generated without enabling a performance monitoring unit (PMI).

Example 9 is a system monitoring performance of a processing device to manage non-precise events includes a memory and a processing device communicably coupled to the memory, the processing device includes a performance counter to increment upon occurrence of a non-precise event in the processing device; a precise event based sampling (PEBS) enable control communicably coupled to the performance counter; a PEBS handler to generate and store a PEBS record comprising architectural metadata defining a state of the processing device at a time of generation of the PEBS record; and a non-precise event based sampling (NPEBS) module communicably coupled to the PEBS enable control and the PEBS handler, the NPEBS module to cause the PEBS handler to generate the PEBS record for the non-precise event upon overflow of the performance counter.

In Example 10, the subject matter of Examples 9 can optionally include an event select (ES) control communicably coupled to the performance counter, wherein the ES control is programmed with an identifier of the non-precise event.

In Example 11, the subject matter of any one of Examples 9-10, can optionally include wherein the non-precise event is a performance event that is not associated with an instruction in an instruction trace, wherein the non-precise event occurs when the instruction does not retire.

In Example 12, the subject matter of any one of Examples 9-11 can optionally include wherein the PEBS record for the non-precise event is generated when the PEBS enable control is set for the performance counter.

Example 13 is a method for monitoring performance of a processing device to manage non-precise events comprising incrementing a value in a performance counter upon occurrence of a non-precise event generated in a processing device and causing a precise event based sampling (PEBS) handler to generate and store a PEBS record for the non-precise event upon overflow of the performance counter, wherein the PEBS record comprises an architectural metadata defining a state of the processing device at a time of generation of the PEBS record.

In Example 14, the subject matter of Example 13 can optionally include programming an event select (ES) control with an identifier of the non-precise event, wherein the ES control is communicably coupled to the performance counter.

In Example 15, the subject matter of any one of Examples 13-14 can optionally include wherein the non-precise event is a performance event that is not associated with an instruction in an instruction trace, wherein the non-precise event occurs when the instruction does not retire.

In Example 16, the subject matter of any one of Examples 13-15 can optionally include wherein the PEBS record for the non-precise event is generated when a PEBS enable control is set for the performance counter, wherein the PEBS enable control is communicably coupled to the performance counter.

Example 17 is a non-transitory machine-readable storage medium for monitoring performance of a processing device to manage non-precise events. In Example 17, the non-transitory machine-readable medium includes data that, when accessed by a processing device, cause the processing device to perform operations comprising incrementing a value in a performance counter upon occurrence of a non-precise event generated in a processing device and causing a precise event based sampling (PEBS) handler to generate and store a PEBS record for the non-precise event upon overflow of the performance counter, wherein the PEBS record comprises an architectural metadata defining a state of the processing device at a time of generation of the PEBS record.

In Example 18, the subject matter of Example 17 can optional include wherein the operations further comprising programming an event select (ES) control with an identifier of the non-precise event, wherein the ES control is communicably coupled to the performance counter.

In Example 19, the subject matter of any one of Examples 17-18 an optional include wherein the non-precise event is a performance event that is not associated with an instruction in an instruction trace, wherein the non-precise event occurs when the instruction does not retire.

In Example 20, the subject matter of any one of Examples 17-19 can optionally include wherein the PEBS record for the non-precise event is generated when a PEBS enable control is set for the performance counter, wherein the PEBS enable control is communicably coupled to the performance counter.

Various embodiments may have different combinations of the structural features described above. For instance, all optional features of the SOC described above may also be implemented with respect to a processor described herein and specifics in the examples may be used anywhere in one or more embodiments.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device, comprising:
   a performance counter to track a non-precise event in the processing device and to increment upon occurrence of the non-precise event, wherein the non-precise event comprises a first type of performance event that is not linked to an instruction in an instruction trace of the processing device;
   a first handler circuit to generate and store a first record, the first record comprising architectural metadata defining a state of the processing device at a time of generation of the first record, wherein the first handler circuit to generate records corresponding to precise events in the processing device, wherein the precise events comprise a second type of performance event that is linked to an instruction in the instruction trace; and
   a second handler circuit communicably coupled to the first handler circuit, the second handler circuit to cause the first handler circuit to generate a second record for the non-precise event upon overflow of the performance counter regardless of an intervention of a performance monitoring interrupt.

2. The processing device of claim 1, further comprising an event select (ES) control communicably coupled to the performance counter, wherein the ES control is programmed with an identifier of the non-precise event.

3. The processing device of claim 1, wherein the non-precise event is a performance event that is not associated with an instruction in an instruction trace, wherein the non-precise event occurs responsive to the instruction not retiring.

4. The processing device of claim 1, further comprising a precise event enable control communicably coupled to the performance counter, wherein the second record for the non-precise event is generated responsive to the precise event enable control set for the performance counter.

5. The processing device of claim 1, wherein the second handler circuit further to cause the first handler circuit to generate the second record for the non-precise event immediately upon occurrence of the overflow of the performance counter.

6. The processing device of claim 1, wherein the first handler circuit comprises memory storage to store the second record generated for the non-precise event.

7. The processing device of claim 6, wherein the non-precise event is generated without enabling a performance monitoring unit (PMI).

8. A system comprising:
a memory; and
a processing device communicably coupled to the memory, wherein the processing device comprises:
a performance counter to track a non-precise event in the processing device and to increment upon occurrence of the non-precise event, wherein the non-precise event comprises a first type of performance event that is not linked to an instruction in an instruction trace of the processing device;
a first handler circuit to generate and store a first record, the first record comprising architectural metadata defining a state of the processing device at a time of generation of the first record, wherein the first handler circuit to generate records corresponding to precise events in the processing device, wherein the precise events comprise a second type of performance event that is linked to an instruction in the instruction trace; and
a second handler circuit communicably coupled to the first handler circuit, the second handler circuit to cause the first handler circuit to generate a second record for the non-precise event upon overflow of the performance counter.

9. The system of claim 8, wherein the processing device further comprises an event select (ES) control communicably coupled to the performance counter, wherein the ES control is programmed with an identifier of the non-precise event.

10. The system of claim 8, wherein the non-precise event is a performance event that is not associated with an instruction in an instruction trace, wherein the non-precise event occurs responsive to the instruction not retiring.

11. The system of claim 8, further comprising a precise event enable control communicably coupled to the performance counter, wherein the second record for the non-precise event is generated responsive to the precise event enable control set for the performance counter.

12. A method comprising:
tracking a non-precise event generated in a processing device, wherein the non-precise event comprises a first type of performance event that is not linked to an instruction in an instruction trace of the processing device;
incrementing a value in a performance counter upon occurrence of the non-precise event; and
causing a first handler circuit to generate and store a record for the non-precise event upon overflow of the performance counter, wherein the record comprises architectural metadata defining a state of the processing device at a time of generation of the record, and wherein the first handler circuit to generate records corresponding to precise events in the processing device, wherein the precise events comprise a second type of performance event that is linked to an instruction in the instruction trace.

13. The method of claim 12, further comprising programming an event select (ES) control with an identifier of the non-precise event, wherein the ES control is communicably coupled to the performance counter.

14. The method of claim 12, wherein the non-precise event is a performance event that is not associated with an instruction in an instruction trace, wherein the non-precise event occurs responsive to the instruction not retiring.

15. The method of claim 12, wherein the record for the non-precise event is generated responsive to a precise event enable control set for the performance counter, wherein the precise event enable control is communicably coupled to the performance counter.

16. The method of claim 12, wherein the second record for the non-precise event is generated responsive to a precise event enable control set for the performance counter.

17. A non-transitory machine-readable storage medium including data that, when accessed by a processing device, cause the processing device to perform operations comprising:
tracking a non-precise event generated in a processing device, wherein the non-precise event comprises a first type of performance event that is not linked to an instruction in an instruction trace of the processing device;
incrementing a value in a performance counter upon occurrence of the non-precise event; and
causing a first handler circuit to generate and store a record for the non-precise event upon overflow of the performance counter, wherein the record comprises architectural metadata defining a state of the processing device at a time of generation of the record, and wherein the first handler circuit to generate records corresponding to precise events in the processing device, wherein the precise events comprise a second type of performance event that is linked to an instruction in the instruction trace.

18. The non-transitory machine-readable storage medium of claim 17, wherein the operations further comprise programming an event select (ES) control with an identifier of the non-precise event, wherein the ES control is communicably coupled to the performance counter.

19. The non-transitory machine-readable storage medium of claim 17, wherein the non-precise event is a performance event that is not associated with an instruction in an instruction trace, wherein the non-precise event occurs responsive to the instruction not retiring.

20. The non-transitory machine-readable storage medium of claim 17, wherein the record for the non-precise event is generated responsive to a precise event enable control set for the performance counter, wherein the precise event enable control is communicably coupled to the performance counter.

* * * * *